(12) United States Patent
Blackmore et al.

(10) Patent No.: US 7,379,444 B2
(45) Date of Patent: May 27, 2008

(54) METHOD TO RECOVER FROM NODE FAILURE/RECOVERY INCIDENTS IN DISTRIBUTED SYSTEMS IN WHICH NOTIFICATION DOES NOT OCCUR

(75) Inventors: Robert S. Blackmore, Poughkeepsie, NY (US); Amy X. Chen, Poughkeepsie, NY (US); Scott D. Epter, Rhinebeck, NY (US); Chulho Kim, Poughkeepsie, NY (US); Rajeev Sivaram, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 10/351,823

(22) Filed: Jan. 27, 2003

(65) Prior Publication Data

US 2004/0146070 A1 Jul. 29, 2004

(51) Int. Cl.
*H04L 1/12* (2006.01)
*H04L 12/26* (2006.01)

(52) U.S. Cl. ...................... 370/342; 370/216

(58) Field of Classification Search ........ 709/220–224, 709/201, 203, 226; 370/216–217, 220–221, 370/241.1, 242, 248, 249, 457; 714/4, 18, 714/43
See application file for complete search history.

(56) References Cited

U.S. PATENT DOCUMENTS

| | | | |
|---|---|---|---|
| 5,088,091 A | 2/1992 | Schroeder et al. | 370/94.3 |
| 5,138,615 A | 8/1992 | Lamport et al. | 370/94.3 |
| 5,996,075 A | 11/1999 | Matena | 713/200 |
| 6,011,780 A * | 1/2000 | Vaman et al. | 370/237 |
| 6,151,688 A * | 11/2000 | Wipfel et al. | 714/48 |
| 6,161,193 A * | 12/2000 | Garg et al. | 714/6 |
| 6,205,498 B1 * | 3/2001 | Habusha et al. | 710/29 |
| 6,243,814 B1 | 6/2001 | Matena | 713/200 |
| 6,338,146 B1 | 1/2002 | Johnson et al. | 714/4 |
| 6,449,734 B1 * | 9/2002 | Shrivastava et al. | 714/15 |
| 6,519,712 B1 * | 2/2003 | Kim et al. | 714/15 |
| 6,545,981 B1 * | 4/2003 | Garcia et al. | 370/242 |
| 6,625,751 B1 * | 9/2003 | Starovic et al. | 714/11 |
| 6,687,847 B1 * | 2/2004 | Aguilera et al. | 714/4 |
| 6,880,100 B2 * | 4/2005 | Mora et al. | 714/4 |
| 6,918,051 B2 * | 7/2005 | Block et al. | 714/4 |

(Continued)

OTHER PUBLICATIONS

Blackmore et al., Pending Patent Application, U.S. Appl. No. 09/904,815, filed Jul. 13, 2001 and Assigned to IBM Corporation entitled "Efficient Notification of Multiple Message Completions in Message Passing Multi-Node Data Processing Systems".

*Primary Examiner*—Aung S. Moe
*Assistant Examiner*—Redentor Pasia
(74) *Attorney, Agent, or Firm*—Geraldine D. Monteleone, Esq.; Lawrence D. Cutter, Esq.; Heslin Rothenberg Farley & Mesiti P.C.

(57) ABSTRACT

Epoch numbers are maintained in a pair wise fashion at a plurality of communication endpoints to provide communication consistency and recovery from a range of failure conditions including total or partial node failure and subsequent recovery. Once an epoch state inconsistency is recognized, negotiation procedures provide an effective mechanism to reestablish valid communication links without the need to employ global variables which inherently possess greater transmission and overhead requirements needed to maintain communications. Renegotiation of recognizably valid epoch numbers occurs on a pair wise basis.

3 Claims, 5 Drawing Sheets

U.S. PATENT DOCUMENTS 7,047,437 B2 *   5/2006   Naffziger et al. ............... 714/4
7,103,029 B1 *   9/2006   Minowa ..................... 370/342
7,143,153 B1 *  11/2006   Black et al. ................ 709/223
2001/0048660 A1 * 12/2001  Saleh et al. ................. 370/216
2003/0014516 A1 *  1/2003  Blackmore et al. ......... 709/224

* cited by examiner

METHOD TO RECOVER FROM NODE FAILURE/RECOVERY INCIDENTS IN DISTRIBUTED SYSTEMS IN WHICH NOTIFICATION DOES NOT OCCUR

BACKGROUND OF THE INVENTION

The present invention is directed to a method for system recovery in a communications environment in which message packets are sent from one endpoint to another. More particularly, the present invention is directed to the utilization of a system of pair wise epoch numbers to maintain error free communication and communication consistency in a distributed data processing system which includes a plurality of communication endpoints with the use of pair wise epoch numbers providing a mechanism which alleviates the communication constraints imposed by the use of global epoch number systems. Even more particularly, the present invention is directed to a method which provides automatic self-healing when employed in a communications environment in which endpoint failure is possible.

Before describing the present invention in detail, it is useful to provide some background for better understanding its preferred operational environment. The present invention operates in distributed data processing systems. An example of such systems is the pSeries of data processor (formerly referred to as the RS/6000) manufactured and sold by International Business Machines, Inc., the assignee of the present invention. These systems include a plurality of independent data processing nodes each of which inherently includes-one or more central processing units, associated random access memory and is coupled to one or more nonvolatile storage devices with readable and writable media therein. These nodes communicate with each other through the exchange of messages transmitted through one or more communication adapters. These adapters are typically connected to a switch which is provided to direct messages to designated nodes in the distributed system. Communication in this system occurs via the interchange of messages which typically have a data header imbedded in each packet comprising the message. This data header allows the exchange of messages defined by a protocol such as MPI (Message Passing Interface). In the present invention this header includes the presence of an epoch number.

Having considered the environments in which the present invention is found and is most useful, it is now appropriate to consider problems that can occur in this environment and the advantages to their solution as provided by the present invention. In particular, it is possible that an adapter might fail. If this is detected, the node affected by this failure typically has the option of seeking an alternate communication path through another adapter. In this case, or even in the case of a temporary adapter failure, the other nodes in the system can lose track of the message passing status. While such failures could be handled by a system of globally maintained consistency variables, since message passing is often just between a pair of nodes, the system of the present invention entails less overhead since it is based on pair wise sets of epoch numbers.

Additionally, it is noted that a node might also experience a failure of the variety in which the node undergoes a system reset (that is, it starts "from scratch"). The present invention also provides for recovery of communications even in the face of this, more severe mode of failure. In particular, in such scenarios it is important for the node which has failed and which has subsequently recovered be provided with a mechanism which can communicate this fact to other nodes with which it had been communicating.

SUMMARY OF THE INVENTION

In a preferred embodiment of the present invention, a method for establishing or for reestablishing communications in a distributed data processing system, comprises maintaining, at each one of a plurality of communication endpoints in a distributed data processing system, a set of pair wise epoch number indications relative to each other one of the plurality of communication endpoints and negotiating message transmission between pairs of these endpoints based on the pair wise epoch number indications. This method has the significant advantage that it avoids the need for maintaining global status indicators which would otherwise have to be kept in a consistent manner across all of the nodes in the system. It also has the advantage of simplifying the initiation of communications when only a subset of the defined plurality of endpoints is available. Establishment and consistency maintenance across all (or even some) of the nodes in such a system induces an unnecessarily large requirement for the transmission of current system states.

In the present application it is noted that in many cases the term "communication endpoint" may be considered to be synonymous with the term "node," as in the phrase "data processing node." However, in the more generic sense intended herein, the term refers to any source or destination (physical node and software task combination) from which or to which message packets are transmitted. The words "source" and "destination" are used herein to refer to a specific message and are not meant to imply any specific responsibilities of the corresponding endpoint. Similarly, references herein to the terms "message," "message packet," or "packet" should be construed to be synonymous. Furthermore, while the present description focuses upon the transmission of message packets between source and destination nodes, the principles upon which recovery is based are equally applicable to any communications interface. Likewise, as used herein the phrase "distributed data processing system" refers to any computer, data processor, switch, controller, device or data processing system which communicates via the sending and receiving of message packets. The present invention also employs the use of epoch numbers. Typically and preferably, the utilization of such numbers is through their representation as integer variables. However, it is noted that any orderable, monotonic sequence of numbers, characters or symbols may be employed for this purpose. It is further noted that while the present invention speaks in terms of incrementing from a zero value, decrementing from a preselected, non-zero value may also be employed without diverting from the scope of the present invention. Furthermore, while the zero value for the epoch number is employed herein as an indication for a special status (a complete node reset), any other convenient value may also be employed for this purpose.

Accordingly, it is an object of the present invention to provide a method for establishing communications in a distributed data processing system.

It is also an object of the present invention to reestablish communications in situations in which one or more nodes in a distributed data processing system have reinitialized the software task responsible to the communication, either as a result of a hardware/software failure at the task/node level or in response to an explicit recycle request.

It is also an object of the present invention to reestablish communications in situations in which one or more nodes in a distributed data processing system have undergone a temporary failure, such as because of the failure of an adapter.

It is a further object of the present invention to provide a method for establishing negotiation interchanges between nodes as a mechanism for reestablishing communications.

It is a still further object of the present invention to eliminate the need for the establishment, maintenance and transmission of global variables in a distributed data processing system as a mechanism for communications status consistency.

It is yet another object of the present invention to improve the efficiency, reliability and availability of distributed data processing systems.

Lastly, but not limited hereto, it is an object of the present invention to increase the autonomous running of distributed data processing systems.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

The present invention is directed to a communication method usable among nodes in a data processing system, and particularly in distributed data processing systems, to indicate whether one or more of the nodes has failed and recovered (thus resetting its communication data with respect to all other nodes). More particularly, the present invention is operable even in the absence of a mechanisms for broadcasting status information to other nodes in the system. The present invention allows multi-node systems to recover from node communication path failures, without the need to rely on an external source for notification. The present method is designed to work either in the event of partial or even in the event of complete reset of the communication protocols and/or communication status data that occurs. The present method is, in particular, sensitive to the nature and type of the failure that is encountered.

The algorithms employed herein extend the use of an "epoch" numbering scheme from a global node view to a pair-wise node view. Each pair of communicating endpoints, that is, each "source+destination" i is said to be at epoch level $e_i$. Each node maintains a "Ready State" with respect to every other node. If two nodes are mutually in Ready State at the same epoch level, communication proceeds normally. After recovery from a disruptive event (communication is either blocked and restored or a node resets completely) on some node, N, node N goes into a "non-Ready State" with respect to all of the other nodes. When data arrives for communication, the next epoch level is negotiated between node N and all of its communication partners, and the "Ready State" indicator is reset, allowing normal operation to begin again.

The present method for negotiating epoch numbers uses a packet format that is distinguishable from a normal data for epoch processing. Epoch numbers have been used elsewhere to avoid the problem of 'trickle traffic' on distributed systems. In this other epoch number system, communication failure results in a reset of the epoch number associated with data packets. This solution, however, still relies on outside notification to let the nodes in the system know that failures have occurred and a that a new epoch level should be used to validate communication. Also, this prior scheme uses a global epoch number among all nodes in the communication system. In contrast, in the invention disclosed here, epoch numbers, as well as other associated state data, are maintained on a point-to-point basis. State information is maintained at each node for every other node in the system.

The advantage of the present invention is that it uses epoch negotiation to both reach a new epoch number and to provide a mechanism for notification without reliance on any external sources. There is also an advantage in making the renegotiation of an epoch number internal to the communication system as it frees the external user from having to determine a new number and then broadcast this new number to the other nodes. The result is a system with greater fault tolerance with significantly reduced dependence on external status information.

The present invention employs out-of-band communication in the form of packets carrying epoch data after recovery from a disruptive event. Such packets are referred to as epoch packets. When communication reset is required (due to recovery from a communication failure), an epoch renegotiation is carried-out by the exchange of point-to-point epoch data. The present method makes use of three types of special packets for epoch renegotiation:

Ready Requests (aka ReadyReq's)—used to initiate an epoch renegotiation;

Ready Acknowledgments (aka ReadyAck's)—used to acknowledge receipt and acceptance of a Ready Req; and Ready Non-Acknowledgements (aka ReadyNack's)—used to indicate that a node has gone into non-Ready State Packets that transmit non-epoch data are referred to herein either as data packets or as normal packets, and these two terms are used interchangeably as they are considered to be synonymous. The phrase "node reset" is also referred to herein to describe the situation in which a node is lost (failed) and thereafter regains the ability to communicate with some other node. The loss of a communication channel while the node remains up is referred to herein as a "partial reset." When the node itself goes down and restarts, this situation is referred to herein as a "complete reset" or as a "total reset." The distinction is important in that, in the case of a partial reset, the node still retains some state information with respect to the other nodes (most notably the epoch number that it associates with each of the other nodes). In a total reset, it is assumed that all data was lost and that the node has been completely reinitialized. Note that the present algorithm assumes that it is acceptable for a node to recycle its communication data when resets occur. By recycling, it is meant that all non-completed messages involving a reset node are purged, resulting in a "clean slate." Stated more formally, if node N resets, all messages in progress between N and any other node are purged. Similarly, if node M receives notification (in the form of an epoch renegotiation request) from a node N that has reset, then M purges all of the messages in progress between itself and node N as part of the renegotiation process.

Note that epoch processing is send-side driven. If node N recycles, then epoch renegotiation does not take place until N either attempts to send data to some other node or until node N receives data from some other node. At a high level, node-recycle negotiation proceeds as follows:

(1) The node that went through failure/recovery (hereinafter referred to as the "source" or as the "source node") purges all data from the prior communication protocol, goes into a "non-ready" state and increments its epoch number with respect to every other node. As soon as new data arrives to be sent, the subject node sends a Ready Request packet to the destination of the new data (hereinafter referred to as a "target"). The Ready Request contains the new epoch number.

(2) Upon receipt of a valid Ready Request, the target node purges all data resulting from prior communication with the source, goes into non-ready state, sets its epoch number to the new value and sends a ReadyAck to the source with this new epoch number.

(3) Upon receipt of the ReadyAck, the source is assured that the target node has received the ReadyReq and has reset its state with respect to the source. The source sets its epoch number to that of the target and begins transmitting packets.

(4) As soon as a target node receives a data packet from the source with the new epoch number, it goes into ready state, and normal communication resumes.

Recall that epoch renegotiations take place when a node has recycled for some reason. Recall also that an epoch renegotiation does not take place until new data arrives to be sent. There are two cases here to consider:

(1) The recycled node is the first to have a packet to send. In this case, the recycled node plays the role of source and initiates normal algorithmic flow before sending data.

(2) The other node has data to send first. In this case the sender does not know that the recipient has recycled. Upon receipt of a normal data packet, the recipient is in non-ready state and sends a ReadyNack packet to the sender in response. Receipt of this ReadyNack indicates to the sender that the intended recipient is in non-ready state. Since the sender has new data to send, the sender assumes the role of source and initiates normal message transmission.

One invariant of this system is that a ReadyReq is considered valid under normal conditions only if its epoch number is either equal to or is exactly one greater than the current epoch number of the target. A ReadReq with an epoch number equal to the current is ignored unless the recipient is in the non-ready state. This invariant is enforced by only incrementing the epoch when going into non-ready state. A node may recycle any number of times while already in non-ready state without affecting its epoch number. This invariant provides protection against the effects of trickle traffic in the node. Ready Requests that are delayed in delivery have low epoch numbers and are ignored.

There is however a special case in which the invariant does not hold. Partial node recycles occur when nodes lose their ability to communicate but remain alive (such as by adapter failure). Total recycles occur when the entire node goes down. In the case of total node recycle, the entire communication subsystem on the node resets and the epoch number between that node and every other node is reinitialized to zero. Recall that for any node N communication with i other nodes, N maintains i epoch numbers, one for each node. Note also that under normal circumstances, epoch numbers are commutative. That is to say, for any two nodes, say node i and node j, node i's epoch number with respect to node j should be the same as node j's epoch number with respect to node i. If not, then one of i or j has failed and has recovered and epoch renegotiation is either in progress or will begin with the next normal packet that needs to be transmitted in either direction between node i and node j.

Recall that node recycles may be partial or complete, and that the present epoch negotiation algorithm handles both types of recycling events. A partial recycle initiates the negotiation algorithm subject to the epoch number invariant discussed above. A total recycle event (represented by a Ready_Request with epoch 0) is preferably treated as a special case of acceptance outside of the epoch-number invariant.

The acceptance of Ready_request packets that are not subject to the epoch-number invariant introduces the potential for trickle traffic. Ready_Request packets of epoch 0 may be delayed in transit and thus arrive during unintended times. To account for this problem, the present method keeps track of the number of 0-epoch Ready_Requests received and only accepts if the count exceeds an acceptance threshold. In the present process, the acceptance threshold is a tunable parameter. Ready_nacks of epoch 0 are handled in a similar manner. In order to increase the effectiveness of the present counting method, each epoch-0 counter is reset each time any actual communication progress is made. Thus, the counter only reaches the threshold value if no progress is made, in other words, when one of the nodes is genuinely in a non-ready state.

Execution flows are provided here in a top-down fashion, with special cases illustrated in the figures herein which are more particularly discussed below.

Figure 1:
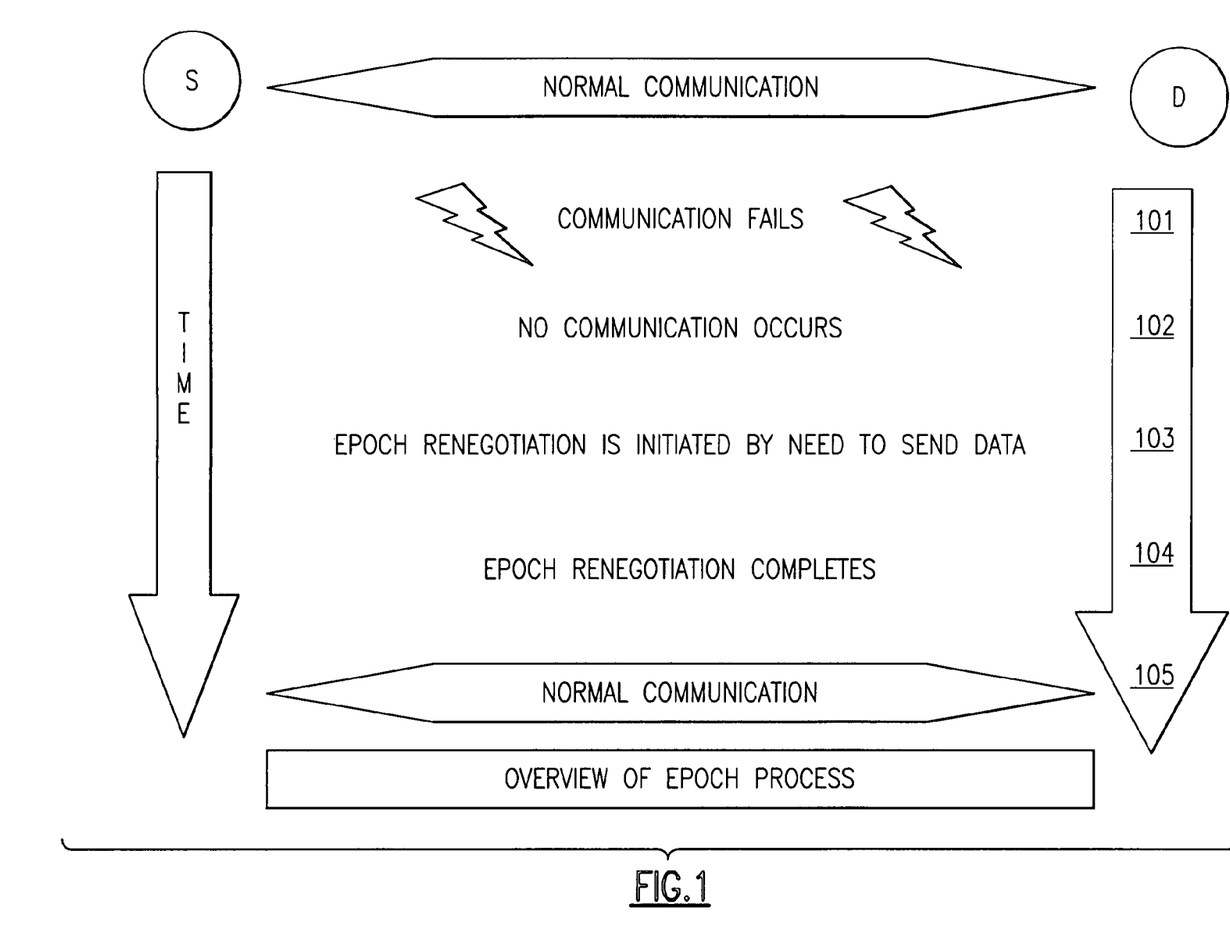
FIG. 1 is a time flow diagram illustrating the overall sequence of events that occurs during performance of preferred versions of the present method.

FIG. 1 illustrates the point at which epoch negotiation is initiated under normal operation. Two nodes, Source and Destination (abbreviated as S or Src and D or Dest, respectively, as needed for convenience in the figures) are communicating normally. When their communication link fails, no epoch processing takes place until one of the nodes seeks to send data to the other. In the example situation illustrated in FIG. 1, the failure occurs at time step 101. No communication takes place between S and D for some time at time step 102, and this may include some time after their communication link has been reestablished. Once data needs to be sent between the nodes, epoch renegotiation is initiated (step 103). After successful completion (step 104), normal communication resumes (step 105).

During epoch renegotiation, S and D are said to be mutually in non-Ready State. Under normal operation, two nodes should remain in mutually Ready-State (i.e. communicating normally) for the majority of the time; epoch processing is simply a method of recovery that is invoked only occasionally. Note that Ready State is always maintained per (source, destination) pair. Throughout the remainder of the present description, references to some node $N_0$ as being in Ready State are understood to be with respect to some other node $N_i$. Also, the assumption is made that a communication link failure implies that all communications between $N_0$ and $N_1$ that were in progress at the time of communication failure are lost. That is, both nodes begin communication after epoch renegotiation with new data. In practice, this assumption means that a node should purge all outstanding partial communications with respect another node when it receives notification that the communication link between them has failed. It is also assumed that communication failures are the responsibility of either one side or the other.

Figure 2:
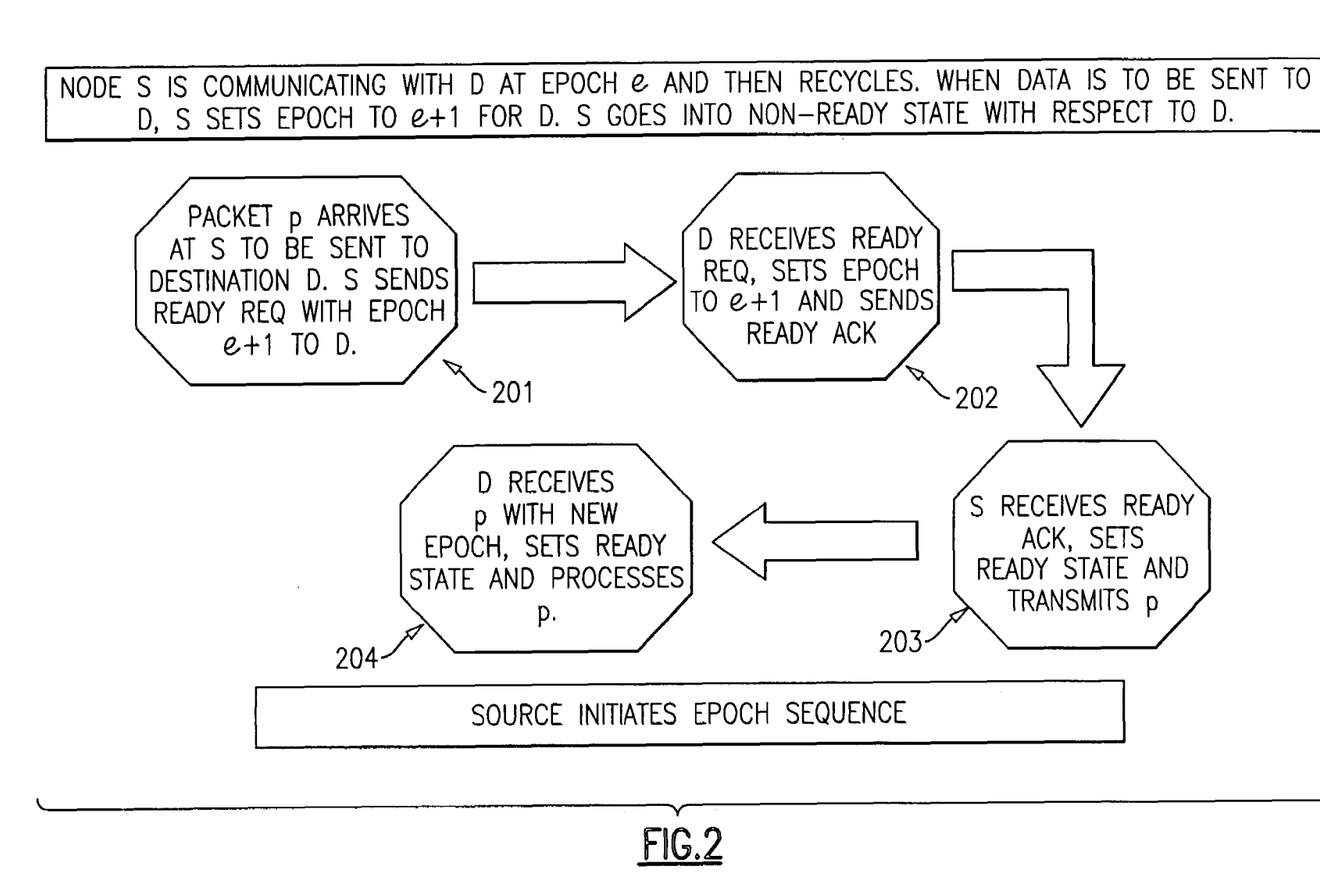
FIG. 2 is a process flow diagram illustrating the situation in which the message or packet source initiates an epoch sequence.

Note that the epoch renegotiation process is different depending on whether it is the source node that has failed or it is the case that the destination node has failed. FIG. 2 illustrates the flow of epoch renegotiation if the sending side has failed. That is to say, two nodes Source node, S, and Destination node, D, are communicating normally and S fails. D may or may not receive notification of S's failure. Once S has more data to send to D, S initiates an epoch number renegotiation, as shown. The renegotiation ensures that D receives notification of S's failure and resumption.

In this case, epoch negotiation processing proceeds as follows (and as is also shown in FIG. 2): S receives data (for example, from an application program) to be sent to D. Since S is not in Ready State with respect to D, S sends a ReadyReq packet to D to initiate the negotiation sequence (step 201 in FIG. 2). Based upon the epoch number of the ReadyReq, D recognizes it as an indication that S has gone to the next epoch level (implying that S has purged all previously in-progress communication with D). D then purges, goes into non-Ready State, increments his epoch (to match that of S) and sends a ReadyAck with the new epoch number (step 202). When S receives the ReadyAck, the epoch number is seen to match S's, and S takes this as an indication that D has purged and gone to the correct epoch level. S then sets Ready State with respect to D and begins transmitting data (step 203). When a packet arrives at D at the new epoch level, D sets Ready State with respect to S, and begins processing packets (step 204). Normal communication is thus resumed at the new epoch level (time stage 5 in FIG. 1).

Figure 3:
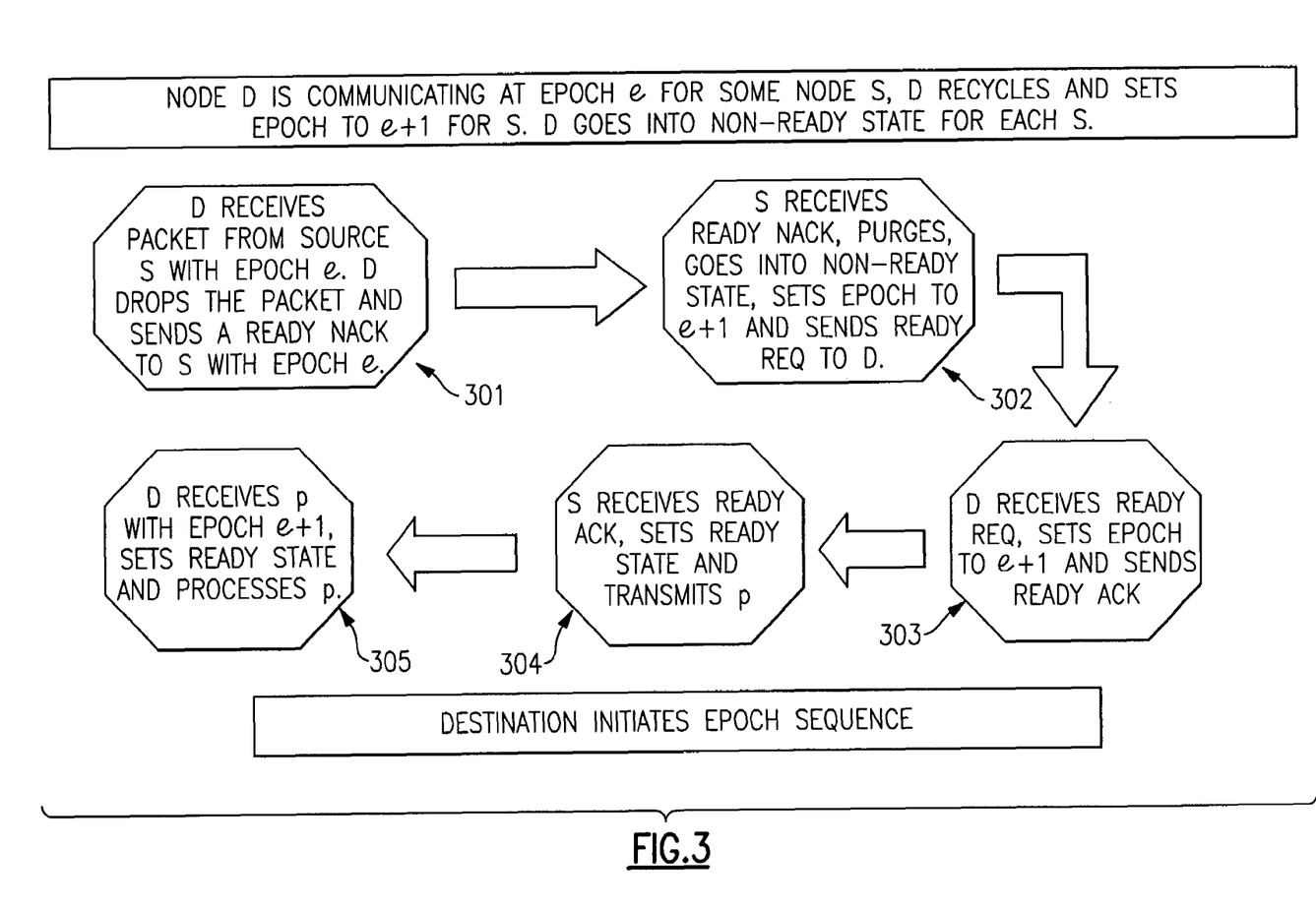
FIG. 3 is a process flow diagram illustrating the situation in which the message or packet destination initiates an epoch sequence.

Epoch processing is slightly different if it is initiated due to a failure on the destination side (see FIG. 3). In this case, S and D are communicating and D fails. If S does not receive notification of D's failure, it continues to send normal packets to D. Since the epoch negotiation is driven from the send side (that is, is initiated by S), D gives notification of its failure by sending to S a ReadyNack packet with epoch number e (step 301). Upon receipt of the ReadyNack, S goes into non-Ready State, purges, increments its epoch number and sends a ReadyReq to D (step 302). FIG. 3 also illustrates the fact that steps 303 to 305 in this case are equivalent to steps 202 to 204 of the epoch negotiation shown in FIG. 2.

SPECIAL CASES

The protocols provided by the present epoch number processing method preferably ensures that any valid epoch packet has an epoch number that is no more than one greater than the current epoch number. If an epoch packet is received for which this condition is not met, the packet is dropped as trickle traffic. There is one special case that violates this invariant and should be considered. In the case of total node failure and recovery, no state information is retained within the failed node. In this case, the recovered node sends a ReadyReq (or ReadyNack as appropriate) with an epoch number of zero. Since complete failures can occur in succession, zero-numbered packets can get stuck in system traffic and arrive erroneously. In order to ensure validity of zero-numbered epoch packets, a counter is maintained for each type. When a zero-packet arrives, it's counter is incremented. If the value exceeds some threshold, the packet is considered valid and an epoch renegotiation is initiated. The modified epoch processing for total node failure and recovery is illustrated in FIGS. 4 and 5.

Figure 4:
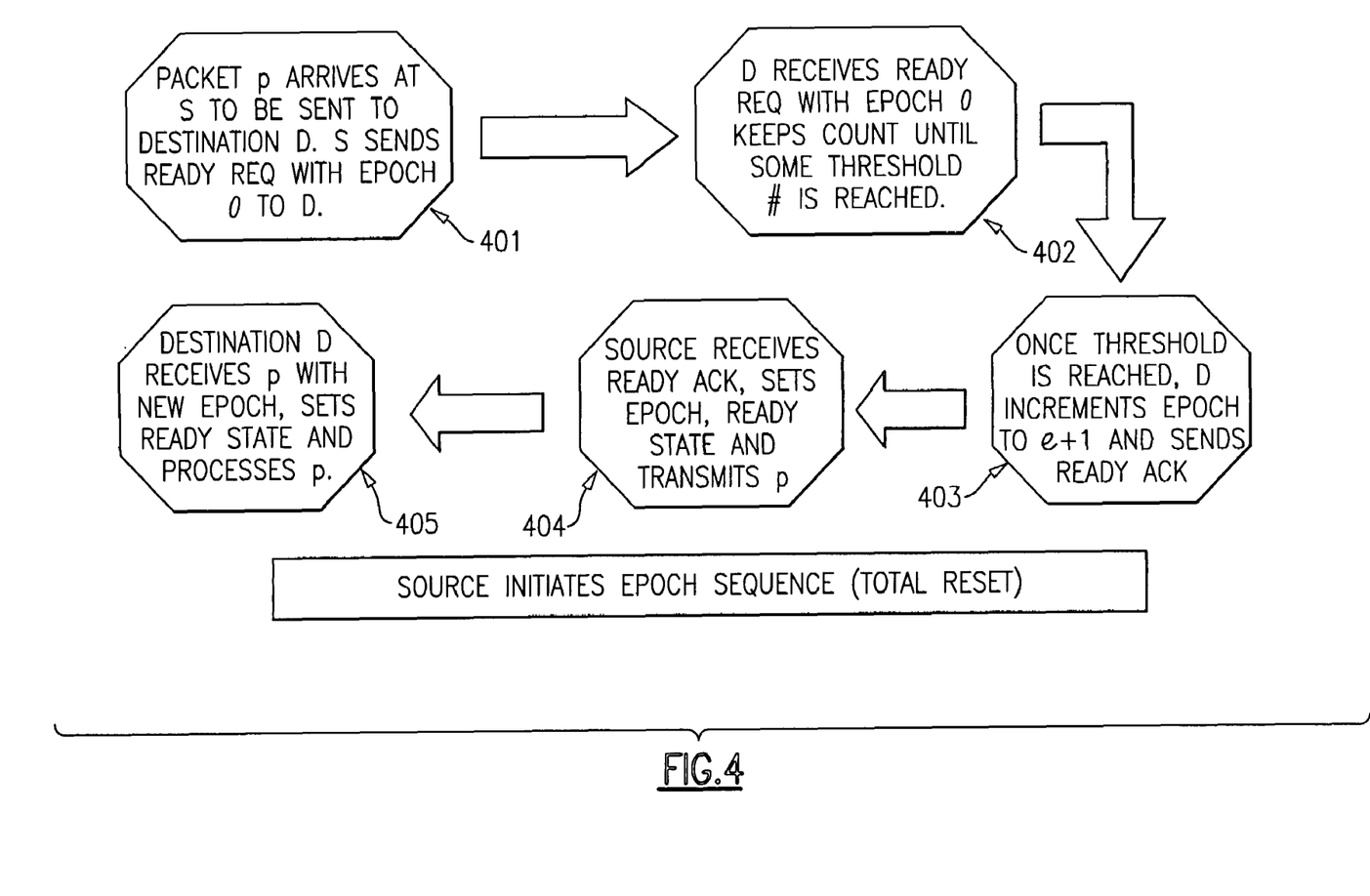
FIG. 4 is a process flow diagram similar to FIG. 2 but illustrating the particular situation in which a total reset occurs at the message or packet source.

FIG. 4 illustrates the case of a send-side failure in the above-mentioned total reset scenario. In this case, the zero-numbered packet is a ReadyReq, and the count is maintained on destination node D (step 402; step 401 is the same as step 201 except that the epoch number is now 0, or some other unique identifier). The appropriate ReadyAck is not sent until the threshold is reached (step 403). Once S receives the ReadyAck (step 404), the data packet is sent to complete the negotiation (step 5), and normal processing ensues.

Note that the case illustrated in FIG. 4 is the same as the initial epoch negotiation. At system initialization, all node pairs are in non-Ready State. As soon as a data transfer is initiated between two nodes, the sender transmits zero-numbered ReadyReqs, resulting in the flow illustrated in FIG. 4.

Figure 5:
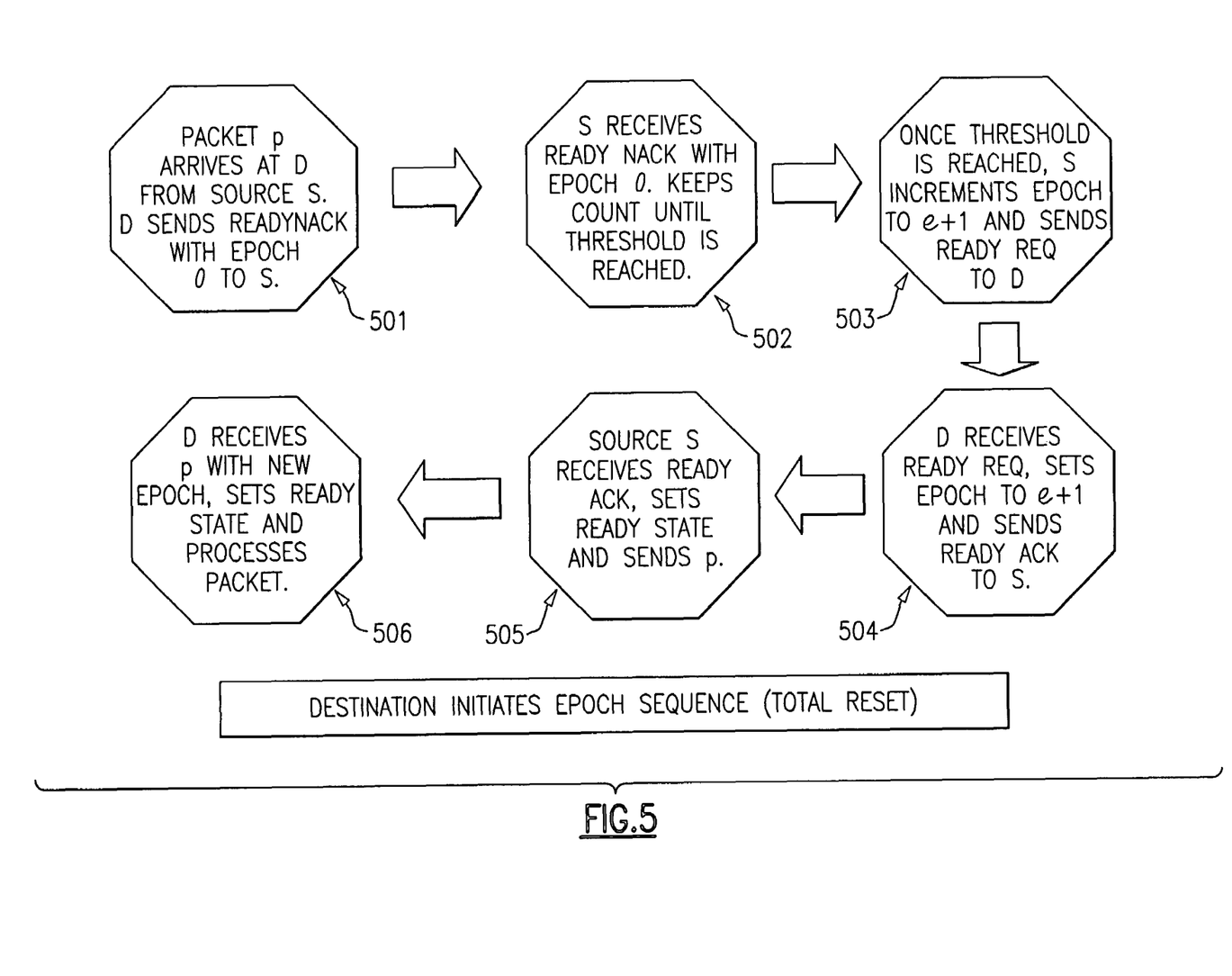
FIG. 5 is a process flow diagram similar to FIG. 4 but illustrating the particular situation in which a total reset occurs at the message or packet destination.

FIG. 5 illustrates the case of a receive-side failure in the above-mentioned total reset scenario. The zero-numbered packet is a ReadyNack (step 501), and the validity count is maintained on the send side (step 502). Once the threshold is reached, the negotiation sequence is initiated with a ReadyReq sent from S to D (step 503). The remaining steps are carried out as above in steps 504 to 506, as shown.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method, for establishing communications in a distributed data processing system, said method comprising:

determining the existence of a state discrepancy between a communication source and a communication destination through the use of a pair wise epoch indication for said communication source and said communication destination;

determining from said epoch indications that said state discrepancy indicates that neither said source nor said destination has undergone a system reset and that a failure at said source has occurred;

negotiating between said source and said destination to establish a new state at said destination consistent with the state at said source so as to permit said source to exit from a non-ready state with respect to said destination, wherein said negotiating includes the steps of:

receiving at said destination a message with a non-matching epoch indication, dropping said message and sending a not-ready acknowledgment message to said source along with the same non-matching epoch indication sent by said source;

receiving at said source said not-ready acknowledgment message, setting said source into a non-ready state with respect to said destination, incrementing the received epoch indication and sending a ready request message to said destination;

receiving at said destination said ready request message from said source, setting its epoch indication with respect to said source to the received epoch indication and sending a ready acknowledgment message to said source;

receiving at said source said ready acknowledgment message, setting its ready state with respect to said destination and transmitting a message to said destination; and receiving said message at said destination with a matching epoch indication and setting its ready state with respect to said source.

2. A method for establishing communication in a distributed data processing system, said method comprising the steps of:

determining the existence of a state discrepancy between a communication source and a communication destination through the use of pair wise epoch indications for said communication source and said communication destination;

determining from said epoch indications that said discrepancy indicates that said source has undergone a system reset;

negotiating between said source and said destination to establish a new state at said destination consistent with the state at said source so as to permit said destination to exit from a non-ready state with respect to said source;

said source setting its epoch number so as to indicate a system reset at said source and sending said epoch indication to said destination with a ready request message;

receiving said epoch indication at said destination and maintaining a count of such received epoch numbers until a threshold is reached;

once said threshold is reached, incrementing said epoch indication and sending a ready acknowledgment message to said source along with said updated epoch indication;

receiving at said source said ready acknowledgment message and said updated epoch indication, setting its epoch indication with respect to said destination to said updated epoch indication, setting its ready state with respect to said destination and transmitting a message to said destination; and receiving said message at said destination with a matching epoch indication and setting its ready state with respect to said source.

3. A method for establishing communication in a distributed data processing system, said method comprising the steps of:

determining the existence of a state discrepancy between a communication source and a communication destination through the use of pair wise epoch indications for said communication source and said communication destination;

determining from said epoch indications that said discrepancy indicates that said destination has undergone a system reset;

negotiating between said source and said destination to establish a new state at said destination consistent with the state at said source so as to permit said destination to exit from a non-ready state with respect to said source;

said negotiation including the steps of:

said destination setting its epoch indication so as to indicate a system reset at said destination and sending said epoch indication to said source with a not ready acknowledgment message;

receiving at said source said epoch indication and said not ready acknowledgment message and maintaining a count of such received epoch indication until a threshold is reached;

once said threshold is reached, incrementing said epoch indication at said source and sending a ready request message to said destination along with said incremented epoch indication;

receiving at said destination said ready request message and said incremented epoch indication, setting its epoch number with respect to said destination to said incremented epoch indication, and sending a ready acknowledgment message to said source;

receiving at said source said ready acknowledgment message, setting said ready state with respect to said destination and transmitting a message to said destination with said incremented epoch indication; and receiving said message at said destination with a matching epoch indication and setting its ready state with respect to said source.

* * * * *